United States Patent
Jang

(10) Patent No.: US 9,728,996 B2
(45) Date of Patent: Aug. 8, 2017

(54) HIGH EFFICIENCY CHARGING APPARATUS USING SWITCHING ARRANGEMENT AND CHARGING/DISCHARGING

(75) Inventor: Suk-ho Jang, Seoul (KR)

(73) Assignee: Run Energy, Seoul (KR)

( * ) Notice: Subject to any disclaimer, the term of this patent is extended or adjusted under 35 U.S.C. 154(b) by 855 days.

(21) Appl. No.: 13/560,445

(22) Filed: Jul. 27, 2012

(65) Prior Publication Data

US 2012/0293134 A1  Nov. 22, 2012

Related U.S. Application Data

(63) Continuation of application No. PCT/KR2011/000547, filed on Jan. 27, 2011.

(30) Foreign Application Priority Data

Jan. 28, 2010  (KR) .................. 10-2010-0007785

(51) Int. Cl.
*H02J 7/02* (2016.01)
*H02J 7/00* (2006.01)
(Continued)

(52) U.S. Cl.
CPC .............. *H02J 7/02* (2013.01); *H02J 7/0042* (2013.01); *H02J 7/0054* (2013.01); *Y02B 40/90* (2013.01); *Y02T 10/7022* (2013.01)

(58) Field of Classification Search
CPC ................ B60L 11/182; H02J 7/007
(Continued)

(56) References Cited

U.S. PATENT DOCUMENTS 5,412,293 A * 5/1995 Minezawa et al. .......... 318/376
5,563,479 A * 10/1996 Suzuki ..................... 318/139
(Continued)

FOREIGN PATENT DOCUMENTS

JP   2005318750 A1   11/2005
KR  1019950001917 B1   3/1995
(Continued)

OTHER PUBLICATIONS

International Search Report for PCT/KR2011/000547 dated Aug. 19, 2011; 6 pages.

*Primary Examiner* — Samuel Berhanu
*Assistant Examiner* — Tarikh Rankine
(74) *Attorney, Agent, or Firm* — Avery N. Goldstein; Blue Filament Law PLLC

(57) ABSTRACT

A high efficiency charging apparatus, includes a power supply which is a source for supplying electricity for charging; a speed setting unit setting an oscillating frequency and outputting an electrical self-oscillating signal having a frequency corresponding to the oscillating frequency; a switching unit having a plurality of switches which are driven by the electrical self-oscillating signal supplied from the speed setting unit; and a power transmitting unit supplying a current from the power supply to a capacitor multiple times according to a drive state of the plurality of switches of the switching unit and discharging the current charged in the capacitor at one time to supply the discharged current to the battery. The charging apparatus improves charging efficiency and reduces a charging time of a lead or nickel battery used in a vehicle or the like.

7 Claims, 3 Drawing Sheets

(51) Int. Cl.
*B60L 11/00* (2006.01)
*B60L 11/18* (2006.01)

(58) Field of Classification Search
USPC .......................................................... 320/137
See application file for complete search history.

(56) References Cited

U.S. PATENT DOCUMENTS

| | | | |
|---|---|---|---|
| 5,798,630 A * | 8/1998 | Sugimori et al. | 320/137 |
| 6,160,722 A * | 12/2000 | Thommes | H02J 9/061 |
| | | | 307/68 |
| 2003/0067278 A1* | 4/2003 | Nakamura et al. | 318/254 |
| 2004/0251881 A1* | 12/2004 | Haydock | B60L 11/1803 |
| | | | 322/24 |
| 2006/0279086 A1* | 12/2006 | Kishibata et al. | 290/31 |
| 2009/0184681 A1* | 7/2009 | Kuno | 320/128 |

FOREIGN PATENT DOCUMENTS

| | | |
|---|---|---|
| KR | 1019960016372 B1 | 12/1996 |
| KR | 1020090011497 A1 | 2/2009 |
| WO | 2011/093643 A3 | 8/2011 |

* cited by examiner

HIGH EFFICIENCY CHARGING APPARATUS USING SWITCHING ARRANGEMENT AND CHARGING/DISCHARGING

CROSS-REFERENCE TO PRIORITY APPLICATION

This application is a continuation of and claims priority to the commonly assigned International Patent Application No. PCT/KR2011/000547 (filed Jan. 27, 2011) and the commonly assigned Korean Patent Application No. 2010-0007785 (filed on Jan. 28, 2010) in the Korean Intellectual Property Office, both of which are hereby incorporated by reference in their entirety.

FIELD OF THE INVENTION

The present invention relates to a high efficiency charging apparatus using a switching arrangement and charging/discharging, and more particularly, to a high efficiency charging apparatus using a switching arrangement and charging/discharging capable of improving charging efficiency of a battery and reducing a charging time thereof using charging and discharging having a time difference therebetween.

BACKGROUND

In general, a lead or nickel battery mounted in a vehicle or the like, requires a charging time of about 4 to 7 hours, unlike a lithium battery which is capable of reducing charging time via increases in chemical performance. The reason is that potential at a supply side is charged at a reduced level due to rapid overload at an initial charging stage of the battery, and charging efficiency is deteriorated due to a counter-electromotive force after power corresponding to a half or more of battery capacity is charged in the battery.

The lead battery mounted in the vehicle has an advantage in which it is inexpensive. However, the lead battery is heavy and has low charging efficiency, and performance (over a lifespan) of the lead battery is deteriorated when the power is not immediately charged in the lead battery after power corresponding to 50% or more of the battery capacity is discharged. In addition, a charging time of the nickel battery has been reduced to approximately 4 hours, which is shorter than that of the lead battery. However, since the nickel battery has a weaker discharge power as compared to the lead battery with the same capacity, the use of the nickel battery in power equipment requiring high power has been avoided.

As described above, in the case of using the lithium battery, charging efficiency may be slightly improved. However, the lithium battery is very expensive and has low stability.

FIG. 1 is a diagram showing a charging circuit of a battery mounted in a vehicle or the like, and charged in a conventional scheme. In a scheme according to the prior art, alternating current (AC) power is supplied to a battery 102 through a rectifying device 101 to be charged in the battery 102. Here, a pulsating current having a small AC ripple, increased as compared to a rated voltage of the battery by about 1.5%, is supplied to the battery 102, thereby promoting an increase in charging efficiency. Here, when the power supplied to the battery 102 becomes 1.5% or more higher than the rated voltage thereof, a charging time is reduced; however a lifespan of the battery is also reduced.

Particularly, at the initial charging stage of a discharged battery, the discharged battery is directly connected to a DC power supply as shown in FIG. 1. Therefore, as the potential of the power supply drops to the potential of the discharged battery 102, the power supply instantaneously enters an overload state, such that the battery is not efficiently charged.

In addition, in the case in which power is charged in the battery at a level of a half or less of the battery capacity, that is, approximately at the initial stage of charging, the charging is performed to some degree by a chemical reaction of a battery electrolyte. However, in the case in which the power is charged in the battery at a level of a half or more of the battery capacity, a repulsive action occurs between the electric charges having the same polarity to deteriorate charging efficiency, thereby increasing a charging time.

That is, in the charging circuit of the battery shown in FIG. 1, the more the electric charges which are charged in the battery 102, the larger the repulsive force causing the electric charges supplied to the battery to not be accepted. Therefore, the charging efficiency at the initial stage of charging is not maintained.

SUMMARY OF THE INVENTION

Accordingly, it is an object of the present invention to provide a charging apparatus capable of improving charging efficiency and reducing a charging time of a lead or nickel battery used in a vehicle or the like.

In order to accomplish the above object, there is provided a high efficiency charging apparatus including: a power supply which is a source for supplying electricity for charging; a speed setting unit setting an oscillating frequency and outputting an electrical self-oscillating signal having a frequency corresponding to the oscillating frequency; a switching unit having a plurality of switches which are driven by the electrical self-oscillating signal supplied from the speed setting unit; and a power transmitting unit for driving a current in the power supply multiple times to charge the capacitor according to a drive state of the plurality of switches of the switching unit and discharging the current charged in the capacitor at one time to supply the current to the battery.

The plurality of switches configuring the switching unit may be driven by the electrical self-oscillating signal of the speed setting unit having a time difference therebetween.

The power transmitting unit may include: a first field effect transistor (FET) which is driven by a switching signal through a first switch of the switching unit to form a closed loop for primarily supplying the electric power of the power supply to charge a capacitor and is driven by a switching signal through a second switch of the switching unit and a condenser to form a closed loop for secondarily supplying the electric power of the power supply to charge the capacitor; a second FET which is driven by a switching signal through a third switch of the switching unit to form a closed loop for tertiarily supplying the electric power of the power supply to charge the capacitor; and a third FET which is driven by a switching signal through a fourth switch of the switching unit to form a closed loop connecting between the capacitor and the battery and between the battery and the power supply.

The switches of the switching unit may be repeatedly driven having a time difference therebetween, such that a process of performing charging three times and performing discharging one time are repeated.

The capacitor may be an electrolytic capacitor.

Therefore, according to the present invention, the charging is satisfactorily performed both at the initial charging stage and after the middle charging stage, making it possible to reduce the charging time, the current is constantly supplied to the battery through a switching operation having a time difference for controlling the charging and discharging, thereby making it possible to induce the high efficiency charging and the reduction of the charging time and reduce the damage generated in the supply side due to the load by 50% or more.

Particularly, the present invention may obtain the same effect as the-above-mentioned effect even in the case of charging the power in a battery having a capacity twenty times larger than the supply side power.

BRIEF DESCRIPTION OF THE DRAWINGS

The foregoing and other objects and advantages of the invention and the manner in which the same are accomplished will become clearer based on the following detailed description taken in conjunction with the accompanying drawings in which.

DETAILED DESCRIPTION

The present invention will now be described more fully hereinafter with reference to the accompanying drawings, in which a preferred embodiment of the invention is shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
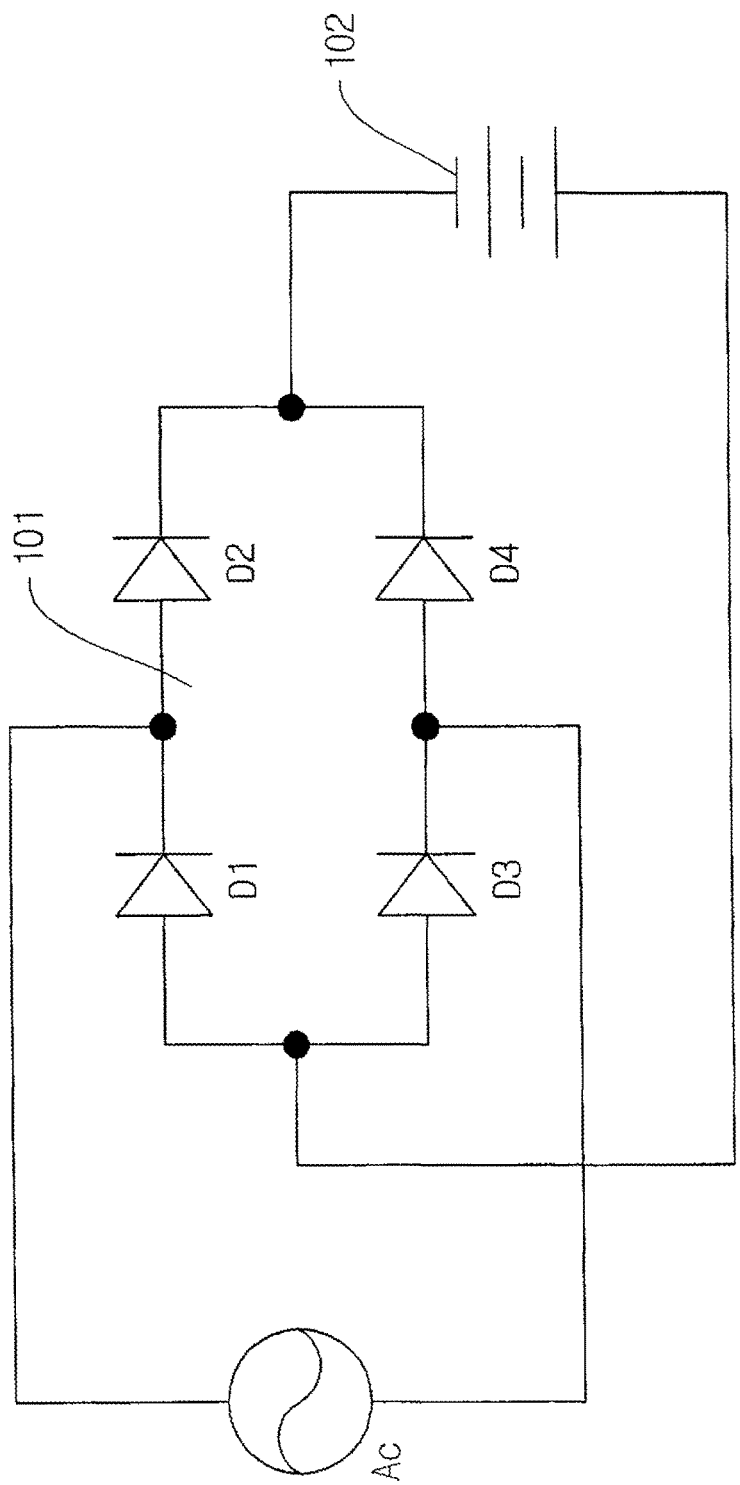
FIG. 1 is a charging circuit diagram of a battery charged in a general charging scheme.
Figure 2:
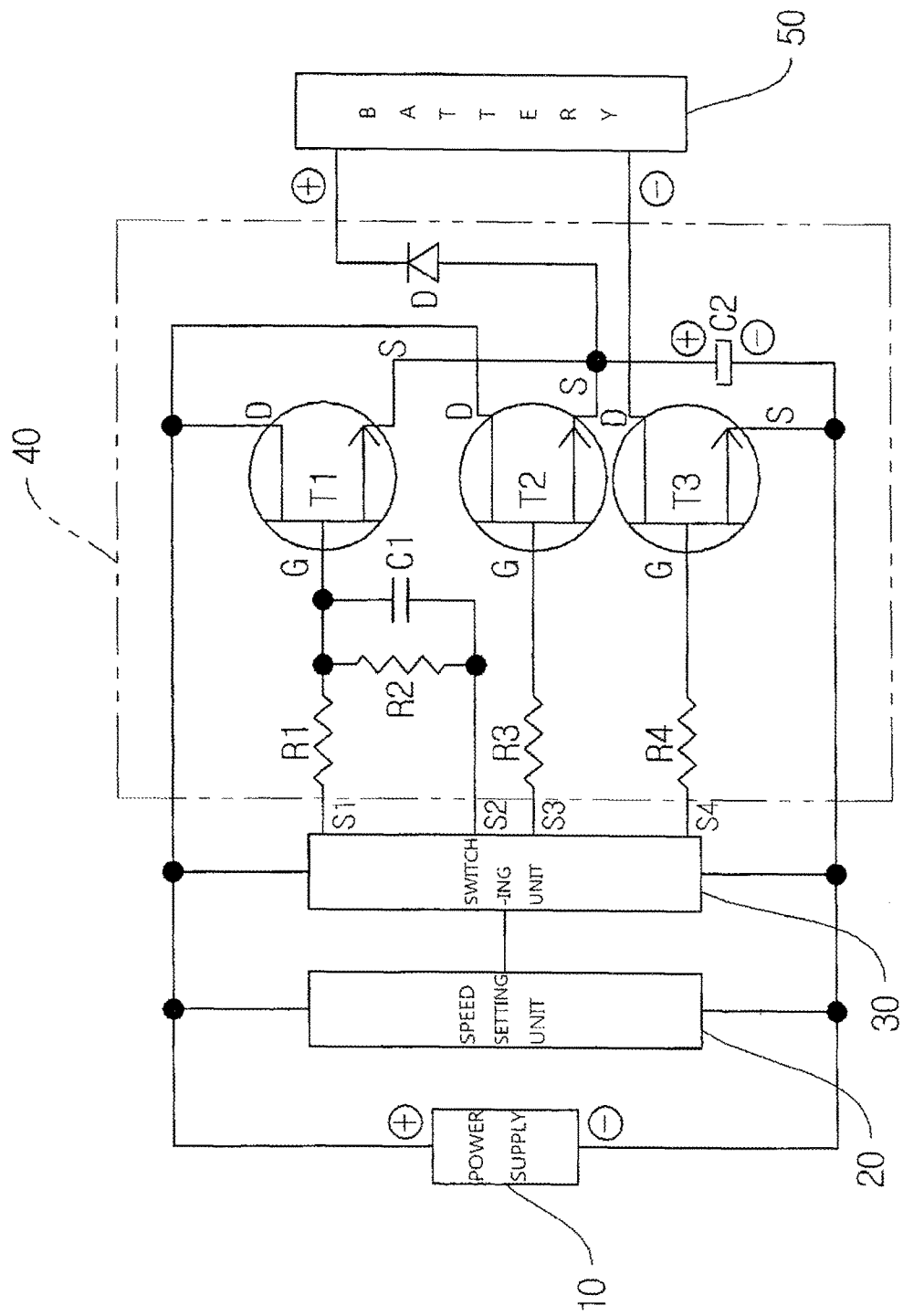
FIG. 2 is a schematic view of a high efficiency charging apparatus using a switching arrangement and charging/discharging according to the present invention.

FIG. 2 is a schematic view of a high efficiency charging apparatus using a switching arrangement and charging/discharging operations according to the present invention. The high efficiency charging apparatus is configured to include a power supply 10 which is a source for supplying electricity for charging, a speed setting unit 20 setting an oscillating frequency and outputting an electrical self-oscillating signal having a frequency corresponding to the oscillating frequency, a switching unit 30 having a plurality of switches S1 to S4 which are driven by the electrical self-oscillating signal supplied from the speed setting unit 20, and a power transmitting unit 40 supplying a current in the power supply 10 to a capacitor multiple times according to a drive state of the plurality of switches S1 to S4 of the switching unit 30 and discharging the current charged in the capacitor at one time to supply the discharged current to the battery 50.

Here, the plurality of switches S1 to S4 configuring the switching unit 30 may be driven by the frequency of the electrical self-oscillating signal supplied from the speed setting unit 20 having a time difference therebetween.

In addition, the power transmitting unit 40 includes a first field effect transistor (FET) T1 which is driven by a switching signal through a first switch S1 of the switching unit 30 to form a closed loop for primarily supplying the electric power of the power supply 10 to charge a capacitor C2 and is driven by a switching signal through a second switch S2 of the switching unit 30 and a condenser C1 to form a closed loop for secondarily supplying the electric power of the power supply 10 to charge the capacitor C2, a second FET T2 which is driven by a switching signal through a third switch S3 of the switching unit 30 to form a closed loop for tertiarily supplying the electric power of the power supply 10 to charge the capacitor C2, and a third FET T3 which is driven by a switching signal through a fourth switch S4 of the switching unit 30 to form a closed loop connecting between the capacitor C2 and the battery 50 and between the battery 50 and the power supply 10.

In addition, the switches S1 to S4 of the switching unit 30 are repeatedly driven having a time difference therebetween, such that a process of performing charging three times and performing discharging one time are repeated. As shown with capacitor C2, an electrolytic capacitor may be used.

Hereinafter, an operation according to the exemplary embodiment of the present invention, that is, a process of charging power in a discharged battery 50 in a vehicle or the like, will be described.

In the case in which the completely discharged battery 50 in, for example, a vehicle, is charged with electricity, it is required to effectively perform charging while being less affected by reduced potential of the battery 50. To this end, as shown in FIG. 2, the second and third FETs T2 and T3 serving as a switching element, are used to form the closed loop connecting between the power supply 10 and the battery 50, thereby making it possible to offset load force. In other words, when the electric power of the power supply 10 is supplied, the speed setting unit 20 and the switching unit 30 is first operated to operate the plurality of FETs T1 to T3 configuring the power transmitting unit 40, such that a start load is not suddenly generated.

More specifically, the speed setting unit 20 receiving the electric power of the power supply 10 transfers the electrical self-oscillating-signal having a set speed, that is, a set frequency to the switching unit 30. The plurality of switches S1 to S4 of the switching unit 30 are sequentially driven by the electrical self-oscillating signal supplied from the speed setting unit 20.

First, in the case in which the first switch S1 of the switching unit 30 is driven to apply the switching signal to a gate G of the first FET T1 through a resistor R1, current flows from a drain D of the first FET T1 to a source S thereof to thereby charge the capacitor C2.

Next, even in the case in which the second switch S2 of the switching unit 30 is returned to its original state and the second switch S2 is driven, the above-mentioned operation is performed. In this case, the condenser C1 connected to the second switch S2 supplies power having more waveforms than those as compared to the case in which the first switch S1 is driven, thereby charging the power in the capacitor C2.

Figure 3:
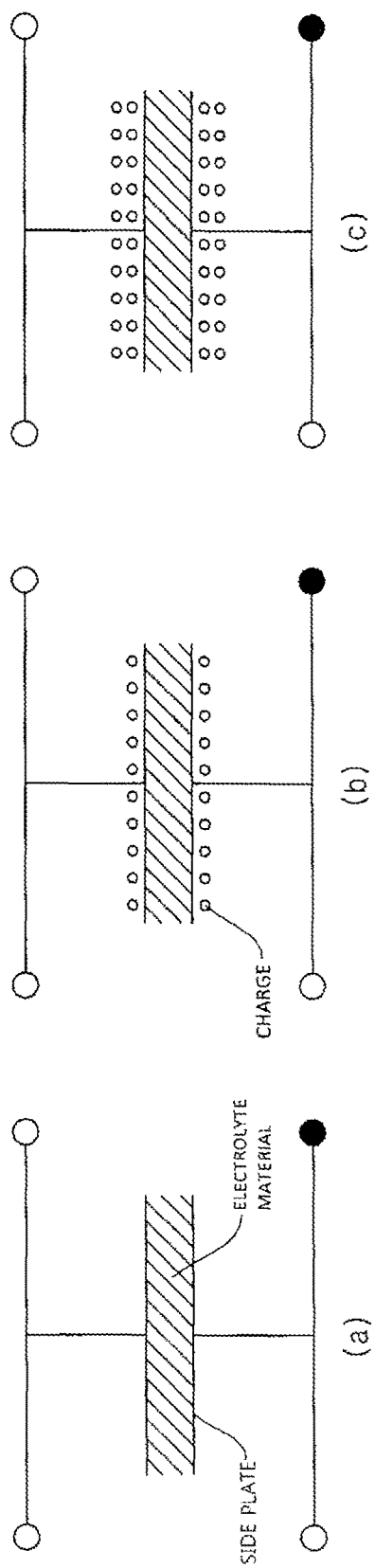
FIG. 3 illustrates an operating principle of an electrolytic capacitor.

The operating principle of the capacitor C2, that is, the electrolytic capacitor will now be described. As shown in FIG. 3(a), in the case in which residual electric charges are not present and voltage is applied in a no-load state, sudden charging is generated thereby damaging the supply side. As shown in FIG. 3(b), in the case in which residual electric charges are present, sudden charging is alleviated due to the residual electric charges, thereby making it possible to alleviate electrical load damage to the supply side. In the case in which many residual electric charges are present as shown in FIG. 3(c), the charging damage decreases in proportion to increased residual electric charges.

There is a need to alleviate the load damage at the time of initial sudden charging using a sudden charging function of a general electrolytic capacitor described above with reference to FIGS. 3(a) to (c). To this end, as shown in FIG. 2, the capacitor C2 discharged through the third FET T3 accommodates residue current and charges the third switch S3 from the state of FIG. 3(b). The electric power is transmitted to allow the third FET T3 to be switched so as to discharge electrified charges of the capacitor C2, such that the capacitor C2 and the third FET T3 are responsible for an electrical charging effect. Therefore, the high efficiency charging apparatus according to the present invention may constantly perform the charging without affecting the supply power and without being affected by the state of the battery 50.

In addition, the second FET T2 that is driven by the switching signal through the third switch S3 of the switching unit 30 also performs a charging operation of a third step following the two steps described above. In this case, current is charged in the battery 50 to some degree through a diode D by charging attraction of the capacitor C2. However, a negative (−) side of the battery 50 does not maintain a load state and the electrified current of the capacitor C2 also maintains a state in which it does not become a full load state. In this state, as soon as the third FET T3 is driven by the switching signal supplied through the fourth switch S4 of the switching unit 30, the power supply 10 and the negative side of the battery 50 are connected to each other to load the capacitor C2, such that the discharging of the capacitor C2 and charging of the battery 50 are simultaneously performed.

Here, the reason why the electric power is repeatedly charged in the capacitor C2 via three steps through the switches S1 to S3 is that the electrolytic capacitor manufactured using an electrolyte material, that is, the capacitor C2 has an instant charging and discharging capability. In addition, in order to solve the problem that the damage is generated in the supply side at instantaneous charging, the capacitor C2 accommodates the residue current after discharging at driving of the third FET T3 and is to be primarily charged with a small amount of current without impact, thereby offsetting an initial impact.

Therefore, with the charging apparatus according to the present invention, a pulse current is supplied through the switching operation by counting to minimize counter electromotive interference with electric charges already charged in the battery, thereby making it possible to obtain stable and excellent charging efficiency from the beginning of the charging to the ending of the charging.

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A high efficiency charging apparatus, comprising:
a power supply which is a source for supplying electricity for charging a battery;
a speed setting unit for setting an oscillating frequency and outputting an electrical self-oscillating signal having a frequency corresponding to the oscillating frequency;
a switching unit having a plurality of switches which are driven by the electrical self-oscillating signal supplied from the speed setting unit;
a power transmitting unit for driving a current in the power supply to a capacitor multiple times in one charging cycle according to a drive state of the plurality of switches of the switching unit to charge the capacitor first and then discharging the current charged in the capacitor to the battery at one time in the charging cycle according to the drive state of the plurality of switches in order to supply the current to the battery, wherein the battery is charged by repeating the charging cycle multiple times; and
wherein the power transmitting unit comprises:
a first field effect transistor (FET) which is driven by a first switching signal through a first switch of the switching unit to form a closed loop for primarily supplying the electric power of the power supply to charge the capacitor and is driven by a second switching signal through a second switch of the switching unit and a condenser to form a closed loop for secondarily supplying the electric power of the power supply to charge the capacitor;
a second FET which is driven by a third switching signal through a third switch of the switching unit to form a closed loop for tertiary supplying the electric power of the power supply to charge the capacitor; and
a third FET which is driven by a fourth switching signal through a fourth switch of the switching unit to form a closed loop connecting between the capacitor and the battery and between the battery and the power supply.

2. The apparatus according to claim 1, wherein the plurality of switches are driven by the electrical self-oscillating signal of the speed setting unit having a time difference therebetween.

3. The apparatus according to claim 1, wherein the switches of the switching unit are repeatedly driven having a time difference therebetween, such that a process of charging the capacitor three times and discharging the capacitor to charge the battery from the capacitor one time in the charging cycle is repeated to charge the electric power of the power supply in the battery.

4. The apparatus according to claim 1, wherein the capacitor is an electrolytic capacitor.

5. A high efficiency charging apparatus, comprising:
a power supply which is a source for supplying electricity for charging a battery;
a speed setting unit for setting an oscillating frequency and outputting an electrical self-oscillating signal having a frequency corresponding to the oscillating frequency;
a switching unit having a plurality of switches which are driven by the electrical self-oscillating signal supplied from the speed setting unit; and
a power transmitting unit for driving a current in the power supply to a capacitor multiple times in one charging cycle according to a drive state of the plurality of switches of the switching unit and discharging the current charged in the capacitor to the battery at one time in the charging cycle, wherein the battery is charged by repeating the charging cycle multiple times,
wherein the power transmitting unit comprises:
a first field effect transistor (FET) which is driven by a first switching signal through a first switch of the switching unit to form a closed loop for primarily supplying the electric power of the power supply to charge the capacitor and is driven by a second switching signal through a second switch of the switching unit and a condenser to form a closed loop for secondarily supplying the electric power of the power supply to charge the capacitor;

a second FET which is driven by a third switching signal through a third switch of the switching unit to form a closed loop for tertiary supplying the electric power of the power supply to charge the capacitor; and a third FET which is driven by a fourth switching signal through a fourth switch of the switching unit to form a closed loop connecting between the capacitor and the battery and between the battery and the power supply.

6. The apparatus according to claim 5, wherein the switches of the switching unit are repeatedly driven having a time difference therebetween, such that a process of charging the capacitor three times and discharging the capacitor to charge the battery from the capacitor one time in the charging cycle is repeatedly performed to charge the electric power of the power supply in the battery.

7. A high efficiency charging apparatus, comprising:
a power supply which is a source for supplying electricity for charging a battery;
a speed setting unit for setting an oscillating frequency and outputting an electrical self-oscillating signal having a frequency corresponding to the oscillating frequency;
a switching unit having a plurality of switches which are driven by the electrical self-oscillating signal supplied from the speed setting unit;
a power transmitting unit for driving a current in the power supply to a capacitor multiple times in one charging cycle according to a drive state of the plurality of switches of the switching unit and discharging the current charged in the capacitor to the battery at one time in the charging cycle;

wherein the switches of the switching unit are repeatedly driven having a time difference therebetween, such that a process of charging the capacitor from the power supply and a process of charging the battery from the capacitor are repeatedly performed to charge the electric power of the power supply in the battery; and wherein the power transmitting unit comprises:

a first field effect transistor (FET) which is driven by a first switching signal through a first switch of the switching unit to form a closed loop for primarily supplying the electric power of the power supply to charge the capacitor and is driven by a second switching signal through a second switch of the switching unit and a condenser to form a closed loop for secondarily supplying the electric power of the power supply to charge the capacitor;

a second FET which is driven by a third switching signal through a third switch of the switching unit to form a closed loop for tertiary supplying the electric power of the power supply to charge the capacitor; and a third FET which is driven by a fourth switching signal through a fourth switch of the switching unit to form a closed loop connecting between the capacitor and the battery and between the battery and the power supply.

* * * * *